United States Patent
Usuda

(10) Patent No.: US 7,154,478 B2
(45) Date of Patent: Dec. 26, 2006

(54) TERMINAL AND METHOD FOR REMOTELY CONTROLLING DEVICE USING THE SAME

(75) Inventor: Hiroshi Usuda, Tokyo (JP)

(73) Assignee: Sony Corporation (JP)

( * ) Notice: Subject to any disclaimer, the term of this patent is extended or adjusted under 35 U.S.C. 154(b) by 276 days.

(21) Appl. No.: 10/412,186

(22) Filed: Apr. 11, 2003

(65) Prior Publication Data

US 2003/0197686 A1    Oct. 23, 2003

(30) Foreign Application Priority Data

Apr. 16, 2002 (JP) ............................. 2002-114031

(51) Int. Cl.
   *G09G 5/00* (2006.01)
(52) U.S. Cl. .................... 345/169; 345/172; 348/14.05
(58) Field of Classification Search ........ 345/156–158, 345/169, 1, 2, 172; 348/734, 14.05, 114, 348/211.99; 341/815.6
   See application file for complete search history.

(56) References Cited

U.S. PATENT DOCUMENTS

| | | | |
|---|---|---|---|
| 5,629,733 A * | 5/1997 | Youman et al. ................ | 725/53 |
| 5,956,025 A * | 9/1999 | Goulden et al. ............ | 715/716 |
| 6,211,856 B1 * | 4/2001 | Choi et al. .................. | 345/666 |
| 6,285,357 B1 * | 9/2001 | Kushiro et al. ............. | 345/169 |
| 6,791,467 B1 * | 9/2004 | Ben-Ze'ev ............. | 340/825.69 |
| 2001/0033243 A1 * | 10/2001 | Harris et al. ................. | 341/176 |

FOREIGN PATENT DOCUMENTS

| | | |
|---|---|---|
| JP | 08-307728 A | 11/1996 |
| JP | 2000-092574 A | 3/2000 |
| JP | 2002-078036 A | 3/2002 |

* cited by examiner

*Primary Examiner*—Richard Hjerpe
*Assistant Examiner*—Duc Dinh
(74) *Attorney, Agent, or Firm*—Lerner, David, Littenberg, Krumholz & Mentlik, LLP

(57) ABSTRACT

Device names and device control parameters are registered in a content table of a terminal. These device names and control parameters are each associated in the content table with partial images forming a total image. A user causes an arbitrary partial image to be displayed on a display screen of the terminal by moving the position of the total image relative to the display screen. After reading the device name and the control parameters corresponding to the arbitrary partial image from the content table, the terminal remotely controls the targeted terminal based on the information read. Therefore, the targeted device and the control description thereof can be selected using a simple operation, such as moving the position of the image to be displayed on the display screen. The addition or replacement of targeted devices can be easily accommodated by updating the content table.

14 Claims, 8 Drawing Sheets

FIG. 3
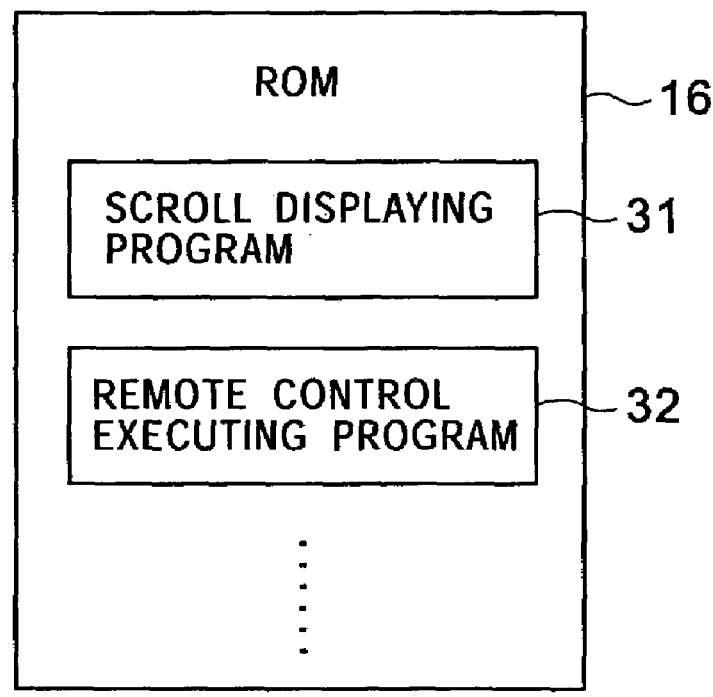
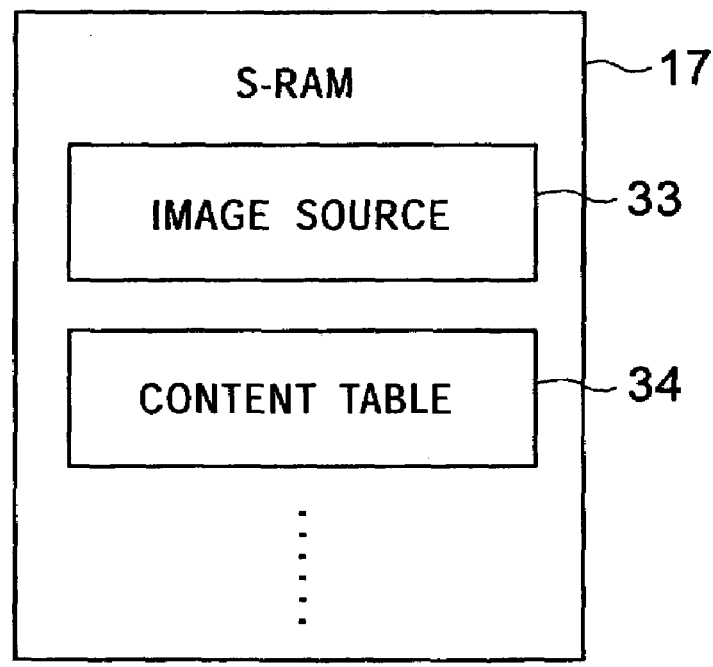

FIG. 5

| 42 REGION | 35 CONTENT ID | 36 CONTENT NAME | 37 CONTENT PROPERTY | 38 DEVICE NAME | 39 CONTROL PARAMETERS | 40 CONTROL PRICE | 41 PARTIAL IMAGE ADDRESS |
|---|---|---|---|---|---|---|---|
| A1 | 1 | TV ON (1 CH) | 2001.10.22.1210 | /dev/TV_No1 | TV=1, Set=on | 1 YEN | --- |
| A2 | 2 | DVD PLAYBACK ON | 2001.10.23.1010 | /dev/DVD_No2 | DVD=2, Set=on | 2 YEN | --- |
| B1 | 3 | VIDEO RECORDING OFF | 2001.10.24.1717 | /dev/VIDEO_No3 | VIDEO=3, Set=off | 1 YEN | --- |
| B2 | 4 | FAX RECEIVING | 2001.10.25.2121 | /dev/FAX_No4 | FAX=4, Set=on | 3 YEN | --- |

34

TERMINAL AND METHOD FOR REMOTELY CONTROLLING DEVICE USING THE SAME

CROSS-REFERENCE TO RELATED APPLICATIONS

The present application claims priority from Japanese Application No. 2002-114031 filed Apr. 16, 2002, the disclosure of which is hereby incorporated by reference herein.

BACKGROUND OF THE INVENTION

The present invention relates to terminals for remotely controlling devices including home electric appliances, and more particularly relates to a terminal for permitting the replacement of remote control devices and relates to a method for remotely controlling the devices using the same.

Recently there have been proposed systems, called a home network, in which not only personal computers but also other various types of home electric appliances link to the Internet or LANs to permit them to be remotely controlled. The home electric appliances that are compatible with the home network are not only audio-visual appliances, such as televisions and video recorders, but also refrigerators, microwaves, and so on, and they are expected to increase in number.

For example, considering a situation in which such home-network compatible appliances are remotely controlled using a single terminal, the terminal is required to have a function to ask a user to select his desired appliance among a plurality of compatible ones and then issue a control command in accordance with the selected appliance. When an appliance is replaced with a new one, the terminal itself must be also replaced with one compatible with the newly replaced appliance, or the ROM thereof may be replaced with a new ROM containing the control commands compatible with the newly replaced appliance.

As an embodiment of such a terminal, a portable information terminal, such as a personal computer or a PDA (Personal Digital (Data) Assistants), can be considered. By using the personal computer as the terminal, the replacement of an appliance can be flexibly accommodated with the help of software. However, even for a notebook computer, a personal computer designed with serious consideration on portability, the operations of a keyboard, a mouse, and the like are required. This therefore does not allow everyone to remotely control the appliance easily from the beginning. Furthermore, despite the portability of the portable information terminal, as long as the feature to remotely control the appliance is provided as an application, the feel of operation of the terminal heavily depends on the quality of the provided application. In addition, since the portable information terminal is principally operated using a pen or a button, it takes a certain amount of time for the user to intuitively operate it.

Recently the operations for using home electric appliances have been very common. It is therefore easily anticipated that the user expects to have the same feel of operation when remotely controlling the appliance. Furthermore, when an appliance is replaced or a feature is changed, complicated replacing processes should not be required on the terminal side.

SUMMARY OF THE INVENTION

Accordingly, it is an object of the present invention to provide a terminal which has superior feel of operation and which easily accommodates the addition and replacement of an appliance to be controlled, as well as a remote control method using the same.

To this end, according to a first aspect of the present invention, there is provided a terminal including a remote-control unit operable to remotely control at least one device; a display unit having a display screen for displaying a part of a total image, the total image including a plurality of partial images; a content table including a piece of content corresponding to each of the partial images, each piece of content including a device name specifying a device to be controlled and control information for controlling the device; a scroll unit for moving a position of the total image relative to the display screen so that any of the partial images can be shown on the display screen; and a unit for obtaining the piece of content corresponding to the partial image shown on the display screen from the content table and for causing the remote-control unit to remotely control the device specified by the piece of content.

In the present invention, at least the device name and the control information thereof are registered in the content table as information required for remotely controlling the device. The device names and the control information thereof are associated in the content table with the corresponding partial images forming the total image.

A user shows an arbitrary partial image on the display screen by moving the position of the image that is shown on the display screen. After the device name and the control information thereof corresponding to this partial image are read from the content table, the device specified by the read content is remotely controlled in the desired manner. The terminal therefore allows the user to select, with a simple operation, the device to be controlled and the control information thereof. By updating the content table, the addition and replacement of devices can be easily accommodated. This can result in a very convenient terminal for the user in many ways.

In the terminal, the scroll unit may include a detecting unit for detecting movement of the terminal, whereby the position of the total image relative to the display screen is moved based on the movement of the terminal. This causes a desired partial image to be moved to the position corresponding to that of the display screen, which is an operation matching the intuition of a human and further improves the feel of operation.

The terminal may include a table update unit for obtaining the piece of content from a source and registering the piece of content in the content table. Since the content table can be easily updated, the burden to the user when the terminal is updated with the addition and replacement of devices is reduced. This results in a more convenient terminal.

In the terminal, the table update unit may obtain the piece of content from a server apparatus linked online to the terminal and may register the piece of content in the content table. This enables the latest piece of content to be easily obtained.

The terminal may include a unit for sorting the content registered in the content table into a plurality of groups and for generating the total image using at least one partial image corresponding to at least one piece of the content belonging to one of the sorted groups. This improves the feel of operation when one device and the control information thereof are selected among many kinds of devices and the control information thereof to remotely control the device.

The terminal may include a unit for performing accounting processing based on account information contained in the piece of content.

According to a second aspect of the present invention, a method is provided for remotely-controlling a device using a terminal having a display screen. The method includes displaying a part of a total image on the display screen, the total image including a plurality of partial images; moving a position of the total image relative to the display screen so that one of the partial images is displayed on the display screen; accessing in the terminal a content table including a piece of content corresponding to each of the partial images, each piece of content including a device name specifying a device to be controlled and control information for controlling the device; reading from the content table the piece of content corresponding to the partial image displayed on the display screen; and remotely controlling the device specified by the piece of content corresponding to the partial image displayed on the display screen.

The remote-control method using the terminal may further include performing accounting processing based on account information included in the piece of content corresponding to the partial image displayed on the display screen.

BRIEF DESCRIPTION OF THE DRAWINGS

FIG. 3 is a block diagram showing the configurations of the programs and data stored in the terminal;

FIG. 5 is a diagram showing an example content table stored in the terminal;

DETAILED DESCRIPTION

Figure 1:
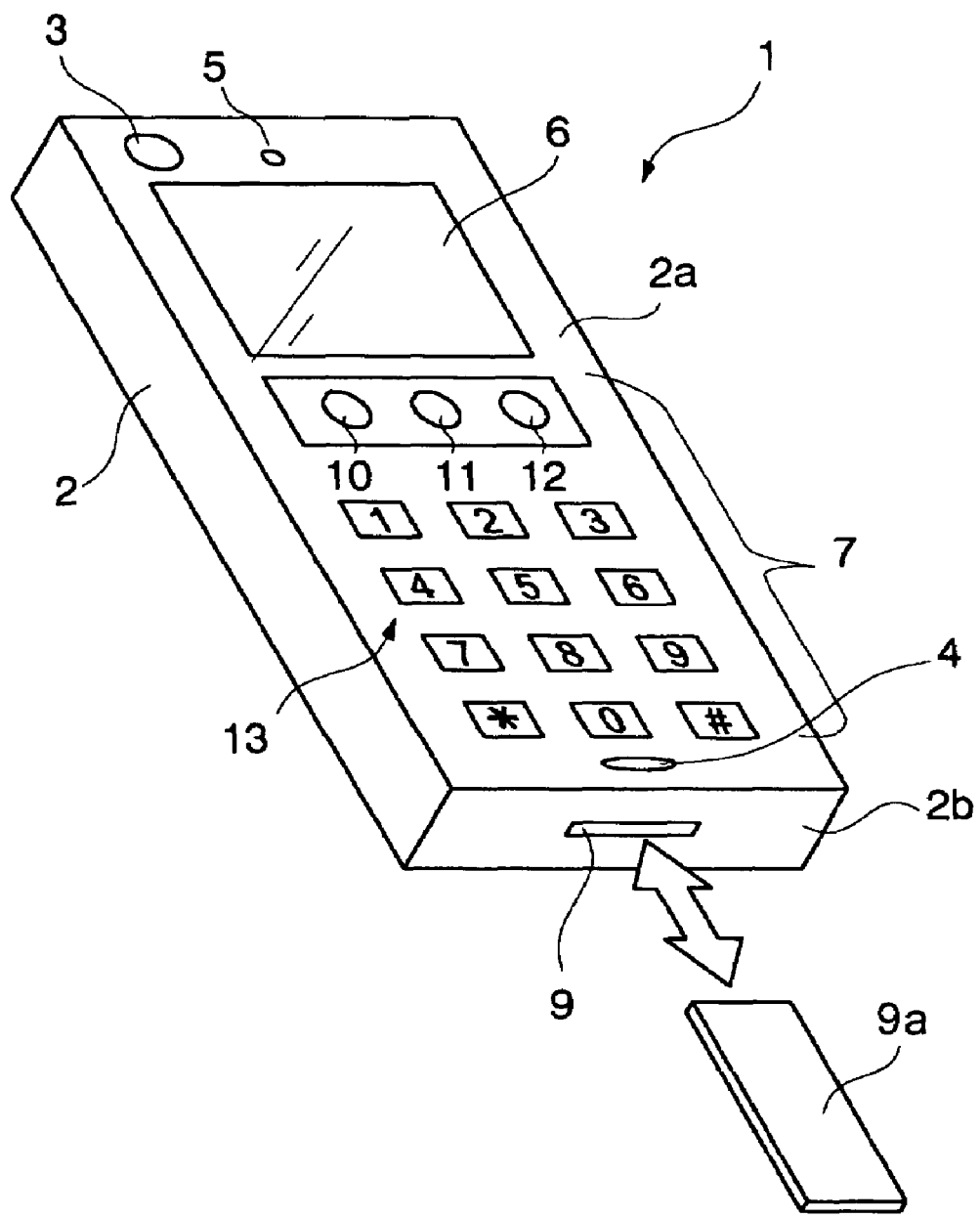
FIG. 1 is a perspective view showing the external structure of a terminal according to the embodiments of the present invention.

FIG. 1 shows a perspective view of a general outline of a terminal 1 having the ability to remotely control an appliance according to a first embodiment of the present invention.

As shown in FIG. 1, the terminal 1 has a casing 2 that may be carried single-handed, for example. On a front face 2a of the casing 2 may be provided a camera 3, a microphone 4, a loudspeaker 5, a display unit 6, an operation region 7, and an infrared communication transmitting and receiving unit (not shown). On a bottom face 2b of the casing 2 may be provided a load unit 9 in which a stick-type storage media 9a can be loaded in a removable manner. The camera 3 may include a CCD (Charge-Coupled Device) camera, and the display unit 6 may include a color LCD (Liquid Crystal Display). The operation region 7 includes an OK button 10, an Undo button 11, a picture-taking button 12, and a numeric-key set 13.

Figure 2:
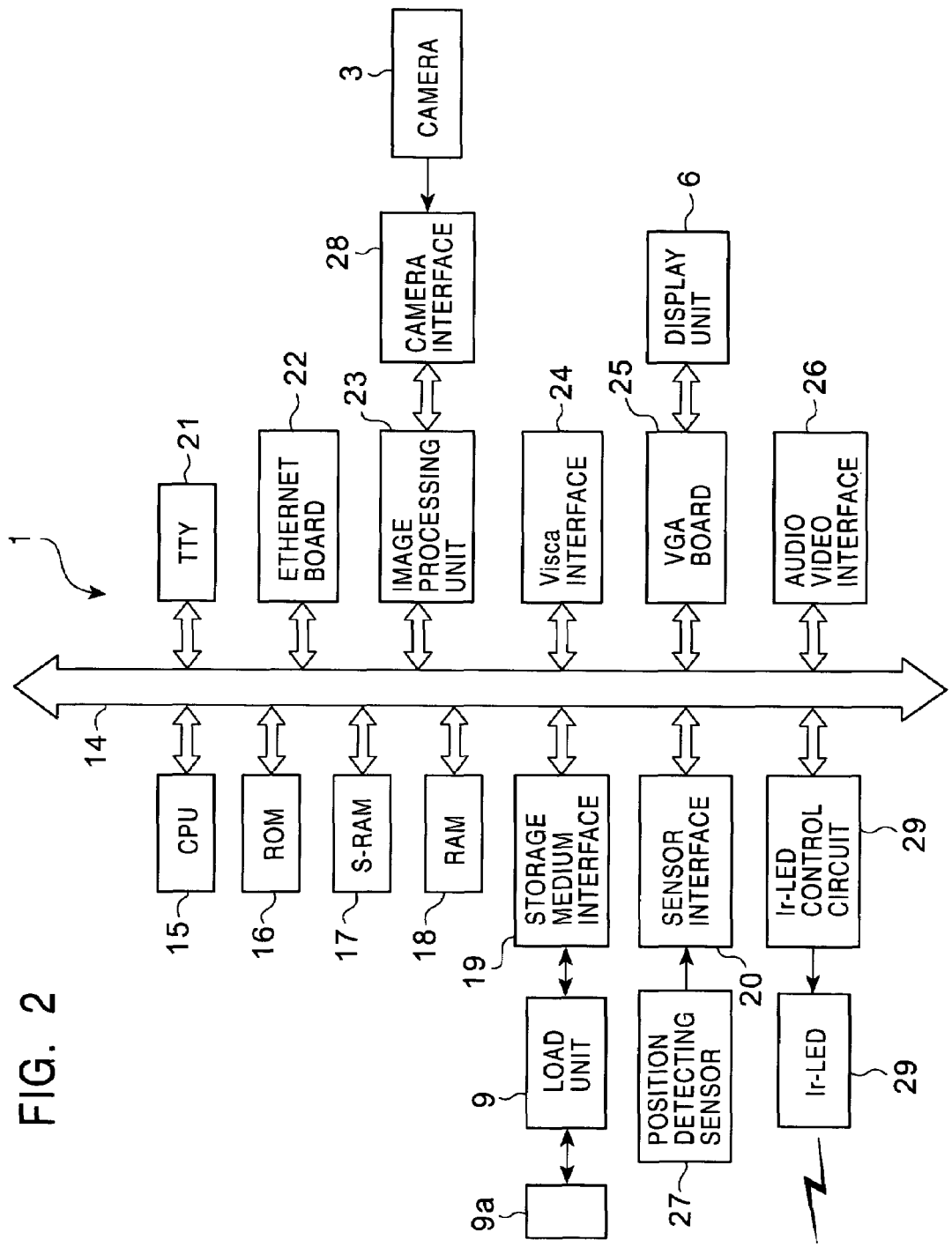
FIG. 2 is a block diagram showing the hardware configuration of the terminal according to the embodiments of the present invention.

FIG. 2 shows the hardware configuration of the terminal 1.

As shown in FIG. 2, the terminal 1 includes a main bus 14 that is connected to a CPU (Central Processing Unit) 15, a ROM (Read Only Memory) 16, an S-RAM (Static Random Access Memory) 17, a RAM (Random Access Memory) 18, a storage medium interface 19, a sensor interface 20, and other types of interfaces, such as TTY (Tele Typewriter) 21, an Ethernet (TM) board 22, an image-processing unit 23, a VISCA (Video System Control Architecture) interface 24, a VGA (Video Graphics Array) board 25, an audio & video interface 26, and an infrared communication module 29.

The CPU 15 controls the overall terminal 1. The ROM 16 contains programs for operating the terminal 1. The S-RAM 17 may contain an image source 33 and a content table 34. The RAM 18 is used as a workspace for the operation of the terminal 1.

The storage medium interface 19 is connected to the load unit 9, thereby being able to communicate (read/write) data with the storage medium 9a loaded in the load unit 9.

The sensor interface 20 is connected to the position-detecting sensor 27. As the position-detecting sensor 27, an acceleration sensor, an angular velocity sensor, or a combination thereof may be used. An acceleration sensor is an element that senses the acceleration of the terminal 1 in its two-axis direction or three-axis direction when, for example, the user moves it in his hand across space. The acceleration sensor may be used to detect the vertical component and the horizontal component of the acceleration that is applied to the terminal 1, so that time integration may be performed on each component of the acceleration to compute the speed component and the displacement component. The computed results may be used to scroll images (described below).

The TTY 21 is connected to the above-described buttons in the operation region 7.

The Ethernet board 22 allows the terminal 1 to link to an Ethernet, through which the terminal 1 links to, for example, a host device, through which the terminal 1 links to the Internet. Alternatively, the terminal 1 may directly link online to the Internet to be connected to a server that serves to provide a piece of content.

The image-processing unit 23 is connected to a camera interface 28 that is connected to the camera (CCD camera) 3. An image captured by the camera 3 can be transferred to the terminal 1 and then can be displayed on the display unit 6.

The VISCA Interface 24 is connected to external computers and the like, and permits various controls on the terminal 1.

A VGA board 25 is connected to an LCD serving as the display unit 6.

An audio video interface 26 is attachable to audiovisual-related appliances. The interface 26 enables signals from the audiovisual-related appliances to go into the terminal 1, and vice versa.

The infrared communication module 29 includes an infrared-emitting diode, a photodiode, and a wave-shaping circuit, and serves to perform infrared communication with a corresponding appliance for remote control.

FIG. 3 shows the layout of the programs and data stored in the ROM 16 and the S-RAM 17, respectively.

The ROM 16 contains a scroll-displaying program 31, a remote-control executing program 32, and various other programs and data required for operating the terminal 1. The S-RAM 17 contains the image source 33 for partial images (described later) and the content table 34. Alternatively, the image source 33 and the content table 34 may be stored in the removable storage medium 9a.

The scroll display program 31 causes part of the total image including a plurality of the partial images to be displayed on the display unit 6. An area that is displayed on the display unit 6 from among the total image is moved (scrolled) in accordance with the movement of the terminal 1 detected by the position-detecting sensor 27.

Figure 4:
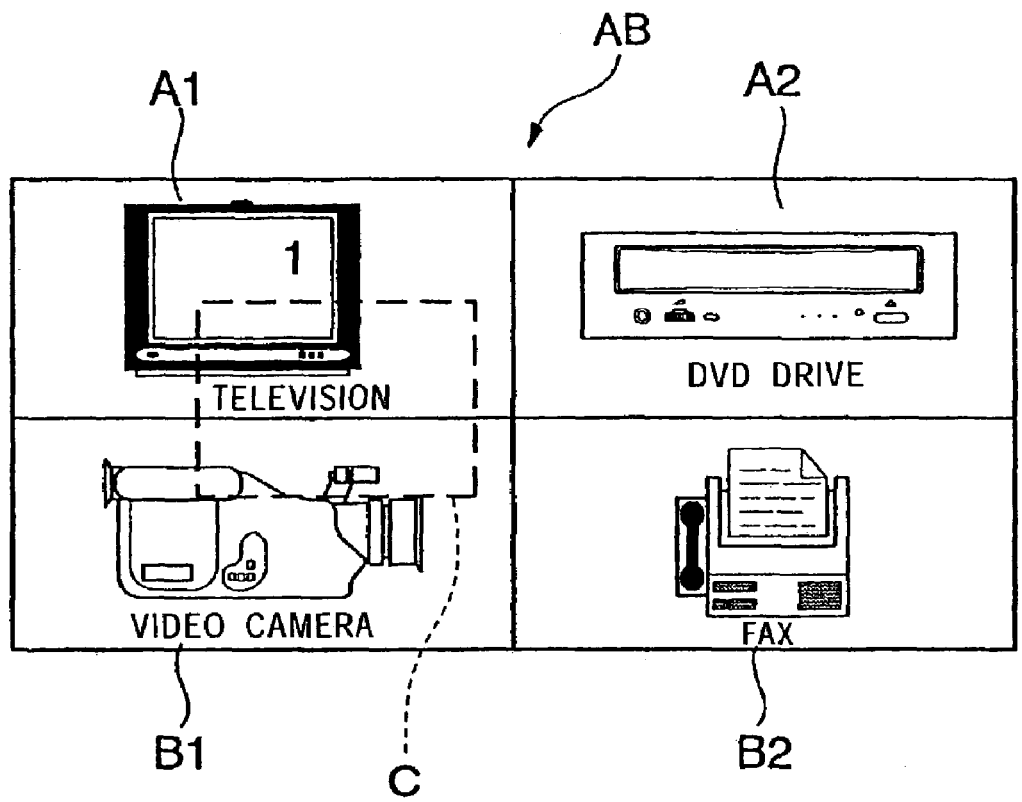
FIG. 4 is a diagram showing the relationship between a plurality of partial images and the total image and a scrolling method of the image.

FIG. 4 shows the relationship between the total image and a plurality of partial images thereof as well as a method of how to scroll the image.

The total image includes four partial images, A1, A2, B1, and B2 obtained, for example, by equally dividing the region. The number of partial images that form the total image AB is variable, and the size of the total image AB is also varied in accordance with the number of partial images.

A region C surrounded with dashed lines is the region displayed on the display unit 6 from among the total image AB. When the user moves the terminal 1 rightward, the position-detecting sensor 27 detects the movement of the terminal 1, causing the total image AB to scroll leftward in the region C (the display screen C). Accordingly, the entirety of the total image AB eventually can be seen by moving the terminal 1 upward, downward, rightward, and leftward.

FIG. 5 shows one example of the content table 34. In the content table 34, a content ID 35, a content name 36, a content property 37, a device name 38, control parameters 39, a control price 40, and a partial image (an icon) address 41 are registered as one piece of content in the form of table formats for each region 42 (each of the partial images, A1, A2, B1, and B2).

The content ID 35 indicates an ID uniquely assigned to each piece of content.

The content name indicates a name assigned to each piece of content.

The content property 37 indicates property information for each piece of content (such as the date when the piece of content is updated).

The device name 38 specifies an appliance to be controlled for each piece of content.

The control parameters 39 indicate the specific control description of the appliance to be controlled for each piece of content using a specific language. The specific control description of the appliance is that when the television, for example, is to be controlled, the television is turned on to channel 1 and then video recording is turned on.

The control price 40 is an account unit price. It may be an account price at which the user is charged whenever the appliance is remotely controlled using the terminal 1. Alternatively, it may be an account price at which the user is charged whenever a piece of content is newly registered to or updated to the content table 34. Alternatively, it may be the purchase price of each piece of content.

The partial image address 41 is the location of a storage area that contains the image source 33 of each partial image in the S-RAM 17 or the storage medium 9*a*.

Each component of the content table 34 can be updated by one piece of content. There are several ways to obtain a new piece of content. For example, a new piece of content may be obtained from the storage medium 9*a* supplied from a content provider. Alternatively, a new piece of content may be downloaded from the server of the content provider that is linked to the terminal 1 via the Internet.

Preferably, the icon (the image source 33) of each of the partial images A1, A2, B1, and B2 shown in FIG. 4 can be easily associated with the corresponding appliance to be controlled and the nature of the control thereof. For example, the icon of the partial image A1 uses an image that is associated with turning on the television to channel 1. This enables the user to intuitively recognize the appliance to be controlled and the nature of the control thereof.

Figure 6:
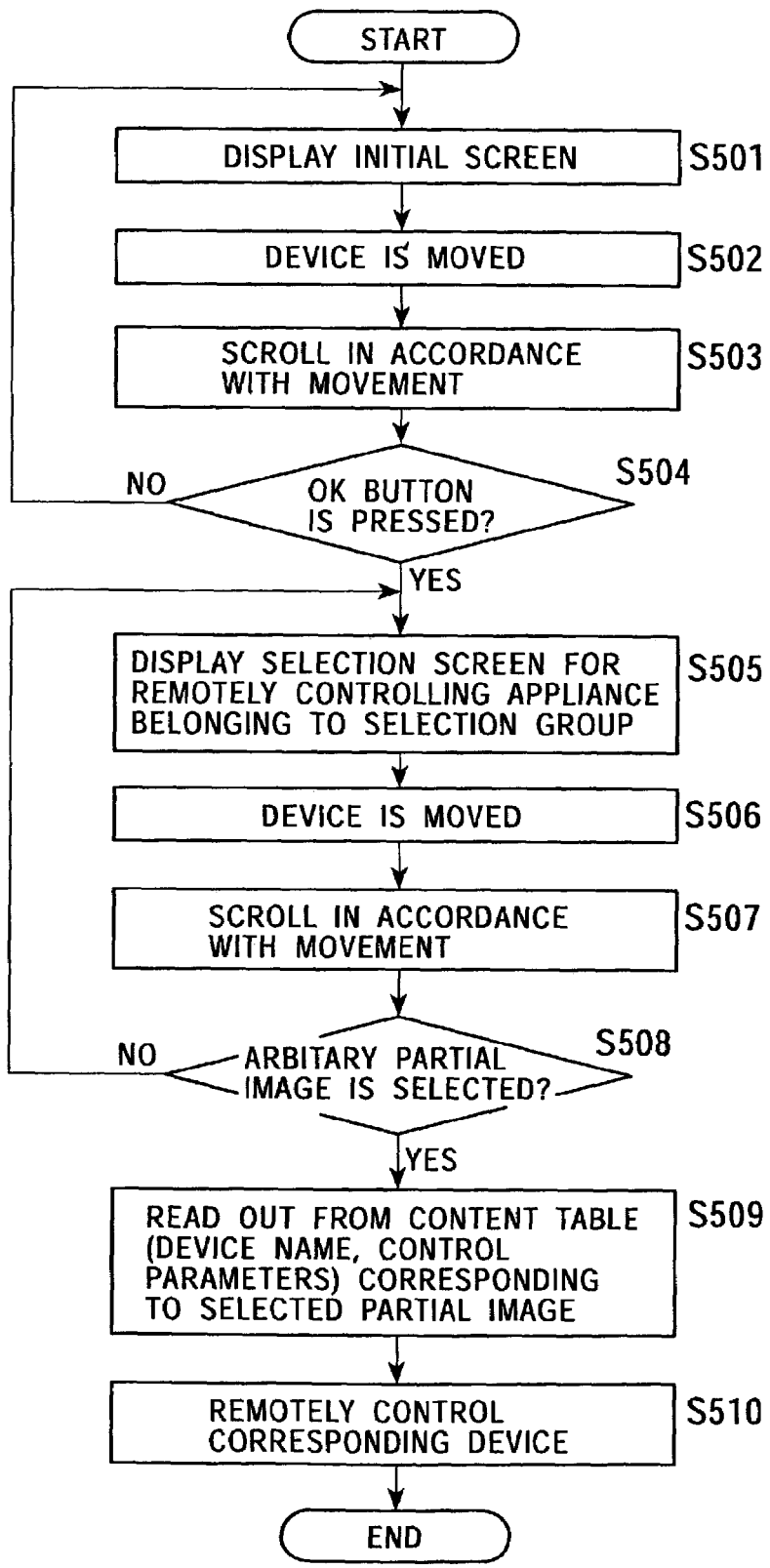
FIG. 6 is a flowchart illustrating the operation of the terminal according to the embodiments of the present invention.

The operation of the terminal 1 will now be described. FIG. 6 shows a flowchart illustrating the operation of the terminal 1.

Figure 7:
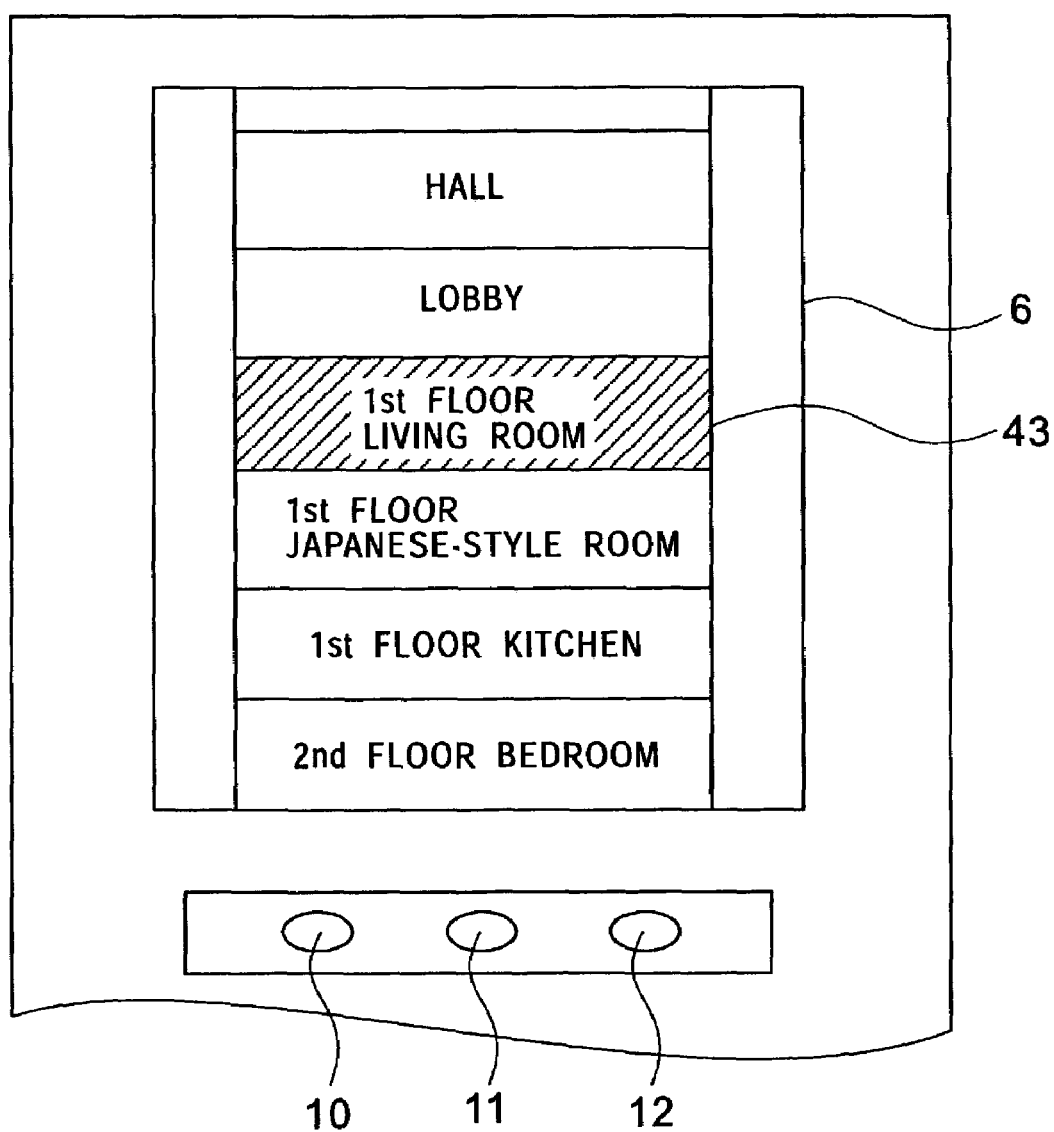
FIG. 7 is a diagram showing an example menu screen shown on a display unit.

When the terminal 1 is turned on, a menu screen is shown on the display unit 6 (step 501). The menu screen shows a list of group names of groups into which the appliances are sorted according to properties thereof, for example, as shown in FIG. 7. Specifically, the appliances may be grouped according to rooms (for example, a hall, a living room, a bedroom, etc.). When there is a plurality of appliances that have the same function, the appliances may be grouped according to functions thereof (for example, the television, the audio device, the lighting device, etc.). Alternatively, they may be grouped according to frequencies of use thereof.

In the example menu screen shown in FIG. 7, the group names that are not shown on the display unit 6 are hidden below the display unit 6. In order to show the hidden group names, the user only has to move the terminal 1 downward.

A group name 43 that can be selected is highlighted on the display unit 6. In this example, the group name that is located in a specific position (for example, the center) on the display unit 6 is highlighted, and then clicking the OK button 10 selects the highlighted group name. That is, the user moves the terminal 1 in the above-described manner (step 502), scrolling the image in the display unit 6 (step 503) so that the highlight moves to the group name in the middle of the display unit 6.

When the highlight moves to the group name 43 of "1st Floor Living Room" and then the OK button 10 is clicked (YES at step 504), there is shown a select screen for remotely controlling each appliance provided on the first floor living room (each appliance belonging to the "1st floor living room" group) (step 505).

That is, the total image AB including the four partial images A1, A2, B1, and B2 are loaded in the display memory where the size of the display memory is large enough for the screen of the display unit 6. The CPU 15 maps a region in the display memory onto the screen of the display unit 6.

The terminal 1 is moved so that the partial image A1 of the television icon shows up from among the total image AB on the screen of the display unit 6 (steps 506 and 507). The highlight moves to the partial image A1 and then the OK button 10 is clicked (YES at step 508). This causes the remote-control executing program 32 to read out the piece of content corresponding to the partial image A1 from the content table 34 (step 509) and to control the infrared communication module 29 using the control parameters of the piece of content, so that the corresponding appliance is remotely controlled (step 510).

That is, the user highlights the partial image A1 of the television and then clicks the OK button 10 in a state in which the transmitting and receiving unit (not shown) for infrared is directed toward the targeted appliance (the television). This realizes a predetermined communication between the transmitting and receiving unit of the terminal 1 and the counterpart of the television, so that the television is remotely controlled.

The user can call, for example, a setting screen from the menu screen by moving the terminal 1. The setting screen allows the user to freely perform setting for, for example, grouping the content registered in the content table 34 into a plurality of groups. That is, names, such as "hall", "living room", and "bedroom" may be set as the names of groups, so that each piece of content belongs to at least one of the groups.

Information on each group set in this manner may be stored in the S-RAM 17 or the storage medium 9a are reflected in the detail of the menu screen while also being reflected in the detail of the content table 34.

When the content is grouped, a content table 34 is provided for each group. The regions of the partial images of each piece of content must be set again so that, for each group, one total image can be formed on the selection screen for remotely controlling the appliance.

Furthermore, that which the user is allowed to set using the terminal 1 includes changing the partial image address 41, that is, changing the image source 33 of the partial image. For example, the image source of the partial image is separately obtained and then is stored in the S-RAM 17, the storage medium 9a, or the like. The storage location of the partial image is registered as the partial image address 41 in the content table 34. This enables the user to change the partial image according to his preference.

An operation for registering a piece of content using the terminal 1 will now be described.

There are several ways to register a piece of content including one to register a piece of content via the storage medium 9a supplied from the content provider and one to register a piece of content via a download from the server of the content provider that is linked online to the terminal 1 via the Internet. Here, there is described the way to register a piece of content via a download from the server that is linked online.

Figure 8:
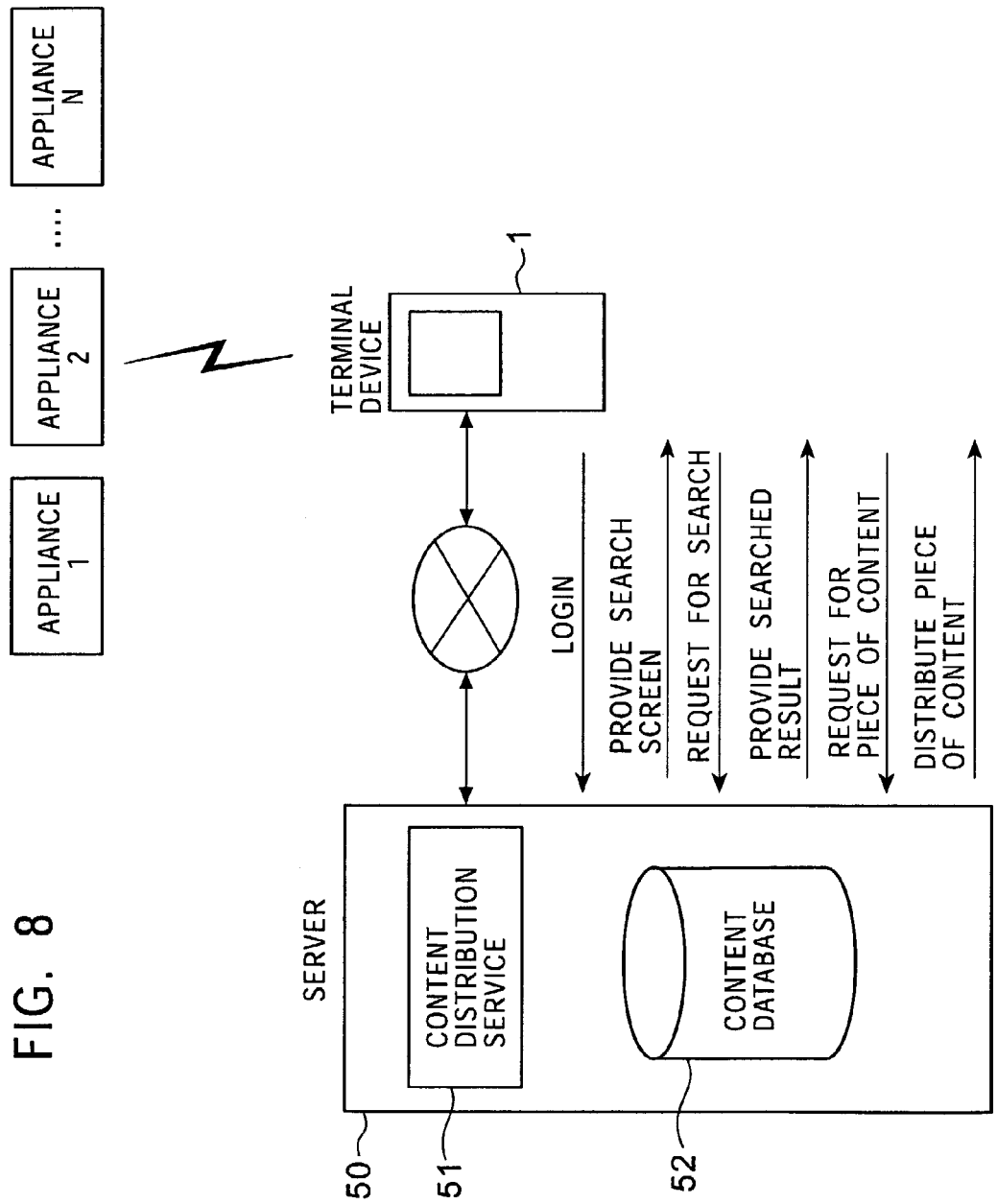
FIG. 8 is an illustration of a method for retrieving one piece of content online.

As shown in FIG. 8, the user causes the terminal 1 to link online to a server 50 of the content provider and logs into the content distribution service 51 provided by the server 50 using a user ID and password prepared beforehand. After the login succeeds, the content distribution service 51 offers a content search screen to the user. In order to be able to efficiently obtain the piece of content concerning the targeted appliance, the content search screen provides a mechanism for searching the content database 52 for the piece of content corresponding to the targeted appliance based on a search keyword (the model number, the manufacture name, etc.) concerning the appliance entered by the user, and for then sending back the search result to the user. The content distribution service 51 sends back the search result to the user to allow the user to confirm the subject of the piece of content. In response to a request from the user, the piece of content corresponding to the search result is provided to the terminal 1.

Alternatively, a web page of the content distribution service 51 may show a content list which allows the user to select his desired piece of content therefrom, providing the selected piece of content to the terminal 1 of the user.

The procedure to register a piece of content in the content table 34 will now be described.

When registering a piece of content downloaded from the server 50 in the content table 34, the content ID 35 and the content name 36 of the downloaded piece of content are compared with the corresponding components of the content table 34. When the content table 34 has an existing piece of content whose content ID 35 and content name 36 match with those of the downloaded piece of content, it is determined if the update date of the downloaded piece of content is newer than that of the existing piece of content by comparing the property of the downloaded piece of content with that of the existing piece of content. If the determination is affirmative, the existing piece of content is updated with the downloaded piece of content. If the update dates of both pieces of content are equal, since the components of both pieces of content are also equal, the content table 34 is not updated.

When the content table 34 does not have an existing piece of content whose content ID 35 and content name 36 match with those of the downloaded piece of content, the downloaded piece of content is registered in the content table 34. A new region is allocated in the content table 34, and the components of the downloaded piece of content are registered in the corresponding parts of the new region. The image source of the new partial image may be obtained from the terminal 1 where some image sources may be available as default sources or may be obtained via the download from the server 50. Once the image source is determined, the storage location of the image source (the partial image address 41) is registered in the content table 34.

In the terminal 1, the control price 40 is set for each piece of content in the content table 34. Using the control price 40, accounting processing for remotely controlling the appliance based on the piece of content registered in the content table 34 can be performed. Many specific accounting methods may be considered.

For example, in the selection screen for remotely controlling the appliance, for the partial image corresponding to each piece of content, the number of times the partial image is selected by the user is counted. The product of the count for each partial image and the corresponding control price 40 is computed, and then the summation of the products is taken over all pieces of content of the content table 34 to compute the total amount for a certain period. This amount may be transferred from the terminal 1 to the server 50 when the terminal 1 links online to the server 50.

Accounting processing may be performed using the control price 40 as an account charge that occurs whenever a piece of content is registered or updated in the content table 34. Alternatively, the purchase price may be set for each piece of content and then the total purchase amount of the content may be computed, whereby, for example, the total amount is transferred to the server 50 from the terminal 1 when the terminal 1 links online to the server 50.

The present invention is not limited to the disclosed embodiments.

For example, in the above embodiments, infrared communication is used as remote control means. However, communication using electric waves, such as a wireless LAN, may be used for remotely controlling the appliance.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A terminal, comprising:
   a remote-operation region operable to remotely control a plurality of devices;
   a display unit having a display screen for displaying a part of a total image that includes a two-dimensional array of regions;
   means for sorting a plurality of content portions into a plurality of groups such that a given part of the plurality of content portions is contained in a specific one of the plurality of groups, the plurality of devices being associated with the plurality of content portions such that a given one of the plurality of devices is associated with a particular one of the plurality of content portions, the plurality of groups being a plurality of rooms of a building in which the plurality of devices is located, a plurality of device functions, or a plurality of frequencies of use;

means for generating a particular total image associated with a given one of the plurality of groups, the total image including a plurality of partial images associated with the content portions belonging to that group such that a given one of the part of the plurality of content portions is associated with a specific one of the plurality of partial images, the plurality of partial images being distributed among the two-dimensional array of regions such that a given one of the plurality of partial images is located at a particular region in the two-dimensional array of regions;

means for generating and storing a plurality of content tables associated with the plurality of groups such that a given one of the plurality of content tables includes the part of the plurality of content portions contained in a particular one of the plurality of groups, a given one of the part of the plurality of content portions including a device name of the associated device, control information for controlling that device, a storage location of the specific one of the plurality of partial images that is associated with that device, and an identifier of the region in the total image at which that partial image is located;

scroll means for moving a position of the total image relative to said display screen so that the part of the total image shown on said display screen includes at least a portion of one of the plurality of partial images; and means for obtaining, from said content table, the content portion associated with the partial image having the portion shown on said display screen and for causing said remote-control unit to remotely control the device that is associated with that content portion.

2. A terminal according to claim 1, wherein said scroll means comprises detecting means for detecting movement of said terminal whereby the position of the total image relative to said display screen is moved based on the movement of said terminal.

3. A terminal according to claim 1, further comprising table update means for obtaining an updated content portion from a source and for registering the updated content portion in a particular one of the plurality of content tables.

4. A terminal according to claim 3, wherein said table update means obtains the updated content portion from a server apparatus over an online link to said terminal.

5. A terminal according to claim 1, further comprising means for performing accounting processing based on account information contained in that content portion.

6. A method of remotely-controlling a plurality of devices using a terminal having a display screen, said method comprising:

displaying a part of a total image on the display screen, the total image including a two-dimensional array of regions;

sorting a plurality of content portions into a plurality of groups such that a given part of the plurality of content portions is contained in a specific one of the plurality of groups, the plurality of devices being associated with the plurality of content portions such that a given one of the plurality of devices is associated with a particular one of the plurality of content portions, the plurality of groups being a plurality of rooms of a building in which the plurality of devices is located, a plurality of device functions, or a plurality of frequencies of use;

generating a particular total image associated with a given one of the plurality of groups, the total image including a plurality of partial images associated with the content portions belonging to that group such that a given one of the part of the plurality of content portions is associated with a specific one of the plurality of partial images, the plurality of partial images being distributed among the two-dimensional array of regions such that a given one of the plurality of partial images is located at a particular region in the two-dimensional array of regions;

generating and storing a plurality of content tables associated with the plurality of groups such that a given one of the plurality of content tables includes the part of the plurality of content portions contained in a particular one of the plurality of groups, a given one of the part of the plurality of content portions including a device name of the associated device, control information for controlling that device, a storage location of the specific one of the plurality of partial images that is associated with that device, and an identifier of the region in the total image at which that partial image is located;

moving a position of the total image relative to the display screen so that the part of the total image shown on said display screen includes at least a portion of one of the plurality of partial images;

reading, from the content table, the content portion associated with the partial image having the portion displayed on the display screen; and remotely controlling the device that is associated with that content portion.

7. A method according to claim 6, further comprising: performing accounting processing based on account information included in the content portion associated with the partial image displayed on the display screen.

8. A method according to claim 6, wherein said moving step includes moving the terminal, the position of the total image relative to the display screen being moved based on the movement of the terminal.

9. A method according to claim 6, further comprising: obtaining an updated content portion from a source, and registering the updated content portion in a particular one of the plurality of content tables.

10. A method according to claim 9, wherein the updated content portion is obtained from a server apparatus over an online link to the terminal.

11. A terminal according to claim 3, wherein when the updated content portion includes a content ID and a device name that match the content ID and device name of a particular one of the plurality of stored content portions, said table update means replaces that stored content portion with the updated content portion.

12. A terminal according to claim 3, wherein when the updated content portion includes a content ID and a device name that do not match the content ID and device name of any one of the plurality of stored content portions, said table update means stores the updated content portion in a new region of the particular one of the plurality of content tables.

13. A method according to claim 9, wherein when the updated content portion includes a content ID and a device name that match the content ID and device name of a particular one of the plurality of stored content portions, said registering step includes replacing that stored content portion with the updated content portion.

14. A method according to claim 9, wherein when the updated content portion includes a content ID and a device name that do not match the content ID and device name of any one of the plurality of stored content portions, said registering step includes storing the updated content portion in a new region of the particular one of the plurality of content tables.

* * * * *